Patented Dec. 11, 1945

2,390,887

UNITED STATES PATENT OFFICE 2,390,887

COATING COMPOSITIONS

Alan L. Kling, Newtonville, Mass., assignor of one-third to Chalmers F. Landrey, Needham, and one-third to Galen A. Bloom, Newtonville, Mass.

No Drawing. Application March 2, 1943, Serial No. 477,767

1 Claim. (Cl. 106—15)

This invention relates to coating compositions and methods of preparing the same. More particularly, the invention relates to coating compositions having insecticidal properties, the principal object being to provide a porous coating material having suspended therein a large number of minute crystals of a volatile moth-repellent or insecticide, each of the crystals being provided with a porous skin or covering of the coating material which retards the volatilization of the crystals but permits their complete evaporation over an extended period of time.

The coating compositions embodying the present invention are particularly useful in treating the interiors of closets, wardrobes, chests and other confined spaces used for the storage of articles of wool and other materials which are susceptible to damage by moths. By providing the proper volatile insecticide in a suitable paint or the like, the resultant coating composition serves not only as a beautifying agent but as a medium thoroughly to distribute the insecticide throughout the interior surface of the space. This type of treatment is more effective than a cedar lining because of the deadly effect of the insecticide on the moth larvae, and in addition provides a much less expensive method of moth-proofing, while permitting the finishing of the storage space in any desired color.

Paints and other coating compositions for finishing the surfaces of walls provided with materials having insecticidal properties have heretofore been proposed. Some of these compositions have contained a substance poisonous to insects only if actually devoured thereby. While such materials may be entirely suitable to protect surfaces on which they are applied against some types of destructive insects, they do not provide an effective protection against moths for goods stored in a space in which the walls have been thus treated. Another previously proposed composition consists of a conventional oil paint in which is dissolved a suitable moth-repellent material such as naphthalene. With the moth-repellent in solution in such a paint, a definite odor is given off during the drying process of the paint, but once the paint has become dry, the sealing properties of the paint prevent volatilization of the naphthalene and thereby destroy the moth-repellent qualities which are accordingly of limited duration. Inasmuch as it is not desirable to store goods in a space before the paint has become dry, the limitations of such compositions are obvious.

In accordance with the present invention, minute solid particles or crystals of a suitable volatile moth-repellent or insecticide are held in suspension in a water dispersible type of paint which provides, upon drying, a porous coating for the surface to which it is applied. Among the materials which have been found particularly suitable as the insecticidal agent are naphthalene and para-dichlorobenzene. These materials are well recognised moth-destroying agents and maintain their effectiveness over a long period of time, but it will be understood that other volatile insecticides may be used with good results. It is of importance, however, that the paint in which the insecticide is carried in crystalline form does not present an impervious film when dry but should be sufficiently porous to permit a ready volatilization of the crystals. Each individual crystal is held in suspension in the paint and is coated with the porous paint so that the rate of volatilization of the crystals is retarded and will be dependent upon the porosity of the paint.

Among the water dispersible paints which are suitable as a vehicle for the crystalline insecticide are those of the casein base, soya protein base, vegetable protein base, or resin emulsion paints. Plastic paints of the water dispersible type, known in the trade as "texture paints" may also be used as the vehicle for the insecticides.

For dispersing the insecticide in finely divided crystalline form throughout the paint, the following method may be used. The chemicals forming the insecticide are first dissolved in a suitable solvent, preferably one having a high vapor pressure. For naphthalene or para-dichlorobenzine, one solvent that may be used with excellent results is trichloroethylene although other solvents may be equally suitable. The solution of the insecticide is then added to the paint and thoroughly mixed therewith so that the insecticide is distributed uniformly therethrough, after which the solvent is allowed immediately to evaporate leaving the insecticide in crystalline form uniformly distributed in suspension throughout the paint. By this method, the desired small crystals are obtained each of which has a coating of the porous paint covering it which prevents excessively rapid evaporation thereof after the paint is applied to a surface to be treated, but permits evaporation at a steady uniform rate which may extend over a substantial period of time, thereby increasing the effectiveness of the paint as an insecticide, or more specifically as a moth destroyer. With the crystals thus suspended in the paint, they show no tendency whatever to agglomerate or lump together, and do not affect the smooth flowing characteristics of the paint. The size of the crystals depend upon the rate of evaporation of the solvent, the greater the rate, the smaller the crystals. Accordingly, heat may be added to the paint mixture to increase the rate of evaporation if desired. It will be understood, however, that if a solvent having a high vapor pressure is used, less heat will be necessary to obtain the proper rate of evaporation to produce minute crystals than if a solvent having a low vapor pressure is employed.

If it is desired to impart to the space being treated the odor of cedar wood, thereby at least partly counteracting the odor of the naphthalene or para-dichlorobenzine, or other volatile insecticide employed, which odor may be offensive to some people, cedar wood oil, or an emulsion of cedar wood oil may be added to the paint, the oil being emulsified with the paint. This will not in the least alter the effectiveness of the crystalline insecticide but may make the odor of the paint more pleasant.

While I have herein mentioned the use of specific forms of paint of the water dispersible type, it should be understood that other paints of the same type may be employed, as long as the paint has the essential characteristic of porosity, this being important to permit volatilization of the crystals, while retarding the rate only sufficiently to preserve the insecticidal properties of the paint over a long period of time. I have not mentioned any proportions of the volatile materials to be added to the paint as this may be varied within wide limits as desired, the effectiveness of the paint as a moth-destroyer varying of course with the amount of the insecticide added thereto. It will also be understood that the insecticide may be added to the paint by methods other than that specifically described herein, although that method has proved particularly effective in uniformly dispersing the crystals throughout the paint in finely divided form with a minimum of effort.

Having thus described the invention, what I claim as new and desire to secure by Letters Patent of the United States is:

A moth repelling paint for indoor use, comprising a water dispersible paint vehicle selected from the group consisting of animal and vegetable protein bases, said vehicle containing in suspension solid particles of a volatile insecticide, said insecticide consisting of at least one of the group consisting of naphthalene and para-dichlorobenzene, said paint vehicle, when dried, forming a porous coating around the solid particles of the volatile insecticide, and allowing said insecticide to evaporate only very slowly, so that the effectiveness of such insecticide is extended over a long period of time.

ALAN L. KLING.